US012746698B2

(12) United States Patent
Jordan

(10) Patent No.: US 12,746,698 B2
(45) Date of Patent: Sep. 29, 2026

(54) FIBER ART MULTIFUNCTIONAL, MULTITOOL AND METHOD FOR USING SAME

(71) Applicant: Katharine Jordan, Harwich, MA (US)

(72) Inventor: Katharine Jordan, Harwich, MA (US)

( * ) Notice: Subject to any disclaimer, the term of this patent is extended or adjusted under 35 U.S.C. 154(b) by 801 days.

(21) Appl. No.: 18/191,724

(22) Filed: Mar. 28, 2023

(65) Prior Publication Data

US 2023/0311350 A1 Oct. 5, 2023

Related U.S. Application Data

(60) Provisional application No. 63/325,021, filed on Mar. 29, 2022.

(51) Int. Cl.

*B26B 11/00* (2006.01)
*D03J 3/00* (2006.01)
*D04B 3/00* (2006.01)
*D04B 33/00* (2006.01)
*D05B 91/00* (2006.01)
*G01B 3/1089* (2020.01)
*G06C 1/00* (2006.01)
*G06M 1/08* (2006.01)

(52) U.S. Cl.

CPC ................. *B26B 11/00* (2013.01); *D03J 3/00* (2013.01); *D04B 3/00* (2013.01); *D04B 33/00* (2013.01); *D05B 91/00* (2013.01); *G01B 3/1089* (2020.01); *G06C 1/00* (2013.01); *G06M 1/083* (2013.01)

(58) Field of Classification Search

CPC ........... D04B 33/00; D04B 3/00; B26B 11/00; B25F 1/04; G06C 1/00; G09F 11/23; D03J 3/00; D05B 91/00; D05B 91/12; G01B 3/1089

USPC .................................. 66/1 A; D10/97; 7/158

See application file for complete search history.

(56) References Cited

U.S. PATENT DOCUMENTS

| | | | | | |
|---|---|---|---|---|---|
| 689,447 | A * | 12/1901 | Worden | G06C 1/00 | 235/74 |
| 3,322,310 | A * | 5/1967 | Higgs | D04B 3/00 | 312/902 |
| D556,071 | S * | 11/2007 | Jitsuda | A45C 1/00 | D10/97 |
| 7,900,482 | B2 * | 3/2011 | Barry | B26B 11/00 | 66/1 A |

(Continued)

OTHER PUBLICATIONS

Yarn Bar (found at: https://www.youtube.com/watch?v=PIGj83-MZ8M (Year: 2018).*

*Primary Examiner* — Mahdi H Nejad

(74) *Attorney, Agent, or Firm* — Adler Pollock & Sheehan P.C.

(57) ABSTRACT

A multitool for use in fiber arts and crafts, including crocheting, knitting, sewing, quilting, weaving and the like. The multitool has a housing including a top cover and a bottom cover cooperating with the top cover to create a cavity for holding one or more tools of the multitool. The bottom cover includes one or more storage compartments and a rear door configured to engage the storage compartment(s). The multitool further includes a counter having a first dial representing the 1's place, a second dial representing the 10's place, and a third dial representing the 100's place, and wherein the counter is disposed within the housing, and an interior spring finger configured to secure the first, second and third dials.

14 Claims, 4 Drawing Sheets

(56) References Cited

U.S. PATENT DOCUMENTS

| | | | | |
|---|---|---|---|---|
| 10,407,806 | B2 * | 9/2019 | Sullivan | B65D 11/02 |
| 11,213,960 | B2 * | 1/2022 | Ambielli | A45C 1/00 |
| 2010/0050697 | A1 * | 3/2010 | Barry | B26B 11/00 66/118 |
| 2018/0271230 | A1 * | 9/2018 | Fahy | D06H 7/00 |

* cited by examiner

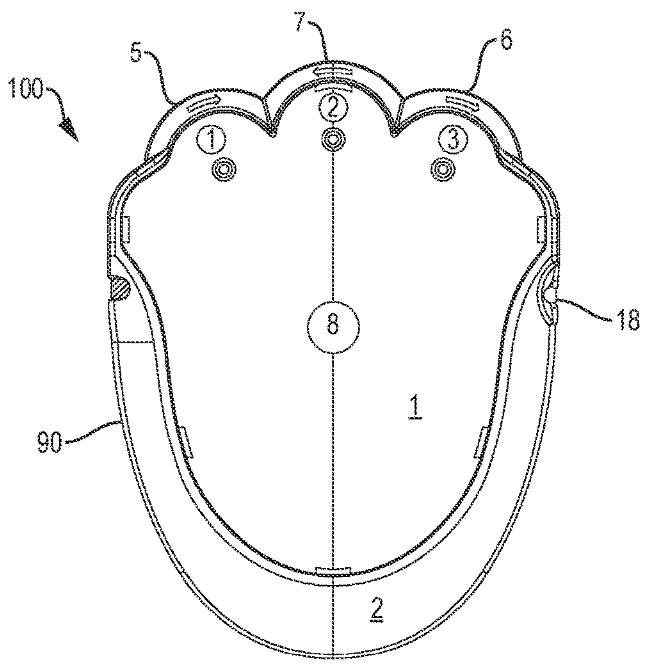
FIG. 1
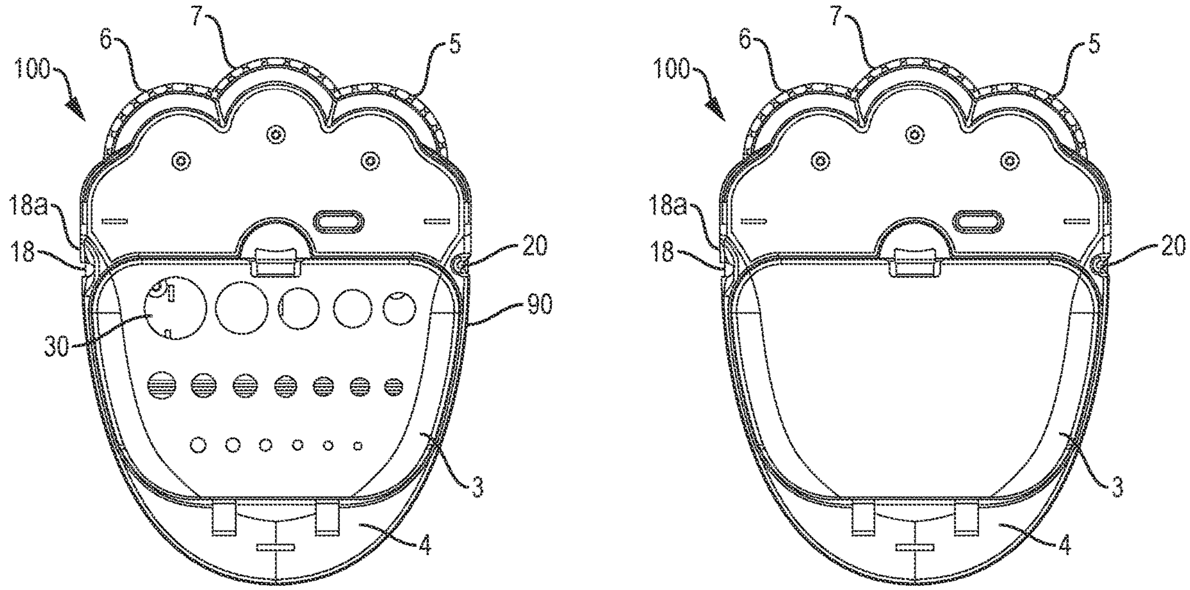
FIG. 2A
FIG. 2B

FIBER ART MULTIFUNCTIONAL, MULTITOOL AND METHOD FOR USING SAME

RELATED APPLICATION

This application claims the benefit of priority to U.S. Provisional Patent Application No. 63/325,021, filed Mar. 29, 2022, the disclosure of which is incorporated by reference herein in its entirety.

FIELD OF THE INVENTION

The invention relates to tools for use in the fiber arts, including, for example, crocheting, knitting, sewing, quilting, weaving, rug hooking, needlepoint, embroidery, punch needling, felting, tatting and macramé.

BACKGROUND OF THE INVENTION

A fiber artist typically needs different apparatus in order to complete projects effectively. Fiber arts include but are not limited to crochet, knitting, sewing, quilting, weaving, rug hooking, needle point, embroidery, punch needling, felting, tatting and macramé. For example, a knitter, crocheter, sewer etc. utilizes a rule or tape measure to measure the lengths of garments (i.e., sleeve length, circumference of neck etc.). A crochet hook can also be utilized when articles are knit, crocheted, woven, macraméed, etc. to weave in ends, pick up dropped stitches or aid in repairs. Thread cutters are utilized to facilitate the cutting of thread, yarn, or string. Fiber artists also utilize other tools/articles, such as scissors, cable needles, needle gauges, row counters as well as stitch holders, nail files, stitch markers, point protectors, straight pins, tapestry and darning needles, safety pins and a storage compartment.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In one aspect of the innovation, a multitool comprises a housing including a top cover and a bottom cover cooperating with the top cover to create a cavity configured to hold one or more tools of the multitool. The bottom cover including one or more storage compartments and a rear door configured to engage the one or more storage compartments. The multitool further includes a counter having a first dial representing the 1's place, a second dial representing the 10's place, and a third dial representing the 100's place, and wherein the counter is disposed within the housing.

In another aspect of the innovation, a multitool comprises a housing including a top cover and a bottom cover cooperating with the top cover to create a cavity for holds one or more tools of the multitool. The bottom cover includes one or more storage compartments and a rear door configured to engage the one or more storage compartments; and a counter having a first dial representing the 1's place, a second dial representing the 10's place, and a third dial representing the 100's place, and wherein the counter is disposed within the housing. The multitool further comprises an interior spring finger configured to secure the first, second and third dials.

BRIEF DESCRIPTION OF THE DRAWINGS

Embodiments of the invention are further described but are in no way limited by the following illustrations.

FIG. 1 is a top plan view of a fiber art multitool according to an embodiment of the invention;

FIG. 2A is a bottom plan view of the fiber art multitool of FIG. 1 with version A of a rear door thereof;

FIG. 2B is a bottom plan view of the fiber art multitool of FIG. 1 with version B of a rear door thereof;

DETAILED DESCRIPTION OF THE INVENTION

Figure 2C:
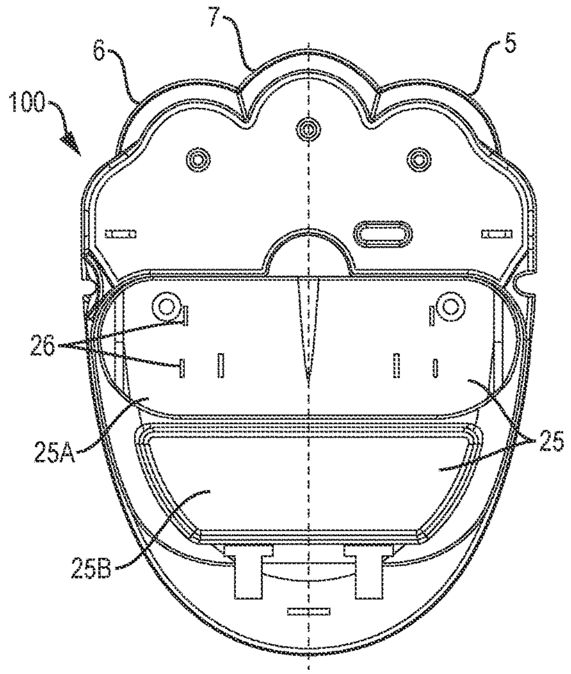
FIG. 2C is a bottom plan view of the fiber art multitool of FIG. 1 with the rear door thereof removed for illustrative purposes.

For clarity and convenience, the meaning of some terms and phrases used in the specification, examples, and appended claims, are provided below. Unless stated otherwise, or implicit from context, the following terms and phrases include the meanings provided below. The definitions are provided to aid in describing particular embodiments, and are not intended to limit the claimed invention, because the scope of the invention is limited only by the claims. Unless otherwise defined, all technical and scientific terms used herein have the same meaning as commonly understood by one of ordinary skill in the art to which this invention belongs. If there is an apparent discrepancy between the usage of a term in the art and its definition provided herein, the definition provided within the specification shall prevail.

As used in this specification and the appended claims, the singular forms "a," "an" and "the" include plural referents unless the content clearly dictates otherwise.

As used herein, the term "approximately" or "about" in reference to a value or parameter are generally taken to include numbers that fall within a range of 5%, 10%, 15%, or 20% in either direction (greater than or less than) of the number unless otherwise stated or otherwise evident from the context (except where such number would be less than 0% or exceed 100% of a possible value). As used herein, reference to "approximately" or "about" a value or parameter includes (and describes) embodiments that are directed to that value or parameter. For example, description referring to "about X" includes description of "X".

As used herein, the term "or" means "and/or." The term "and/or" as used in a phrase such as "A and/or B" herein is intended to include both A and B; A or B; A (alone); and B (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, the term "comprising" means that other elements can also be present in addition to the defined elements presented. The use of "comprising" indicates inclusion rather than limitation.

The term "consisting of" refers to compositions, methods, and respective components thereof as described herein, which are exclusive of any element not recited in that description of the embodiment.

Reference is made in detail to the presently disclosed embodiments of the invention, examples of which are illustrated in accompanying drawings, where in like reference numerals refer to like elements throughout.

Fiber artists utilize all differing methods of containing their tools and notions ranging from plastic sandwich bags to miscellaneous tins, plasticware and cloth bags. The multitool of the present invention solves that problem by combining all of the tools and notions into one neat, organized kit which fits in the user's hand or pocket.

FIGS. 1-4B are multiple views of various embodiments of the fiber art multitool of the present invention, and will be discussed further below, following FIG. 5, which is a disassembled/exploded view of an embodiment of a fiber art multitool 100 according to the present invention.

In the embodiment shown in the figures, the multitool 100 includes a housing 90 (see FIGS. 1, 2A and 2B) having a lens 1, a top cover 2 and a bottom cover 4 with a rear door 3. The lens 1 operates as a protective cover for the decorative vinyl decal which adheres to the top cover 2 as well as a magnifier for the digits on the dials (discussed below). The lens 1 slips into a recess 85 formed in an upper side of the top cover 2 (see FIG. 5) and includes three separate magnification areas for the counter readout (denoted as (1), (2) and (3) in FIG. 1). The rear door 3 opens to reveal one or more storage compartments within the bottom cover 4 (see FIG. 2C). When the top cover 2 and the bottom cover 4 are put together/assembled in a cooperating manner, a cavity is created that holds a hook 9 and pin 10 of the multitool 100.

In an embodiment, the counter of the multitool 100 includes three dials representing the 1's, 10's and 100's places. The 1's place, which is the right-most dial 6, includes a back dial 14 which is fitted with a rear gear to engage with the right most arm of a spring finger 19, a center dial 7, and a front readout dial 12 which is detailed with the digits 1-9. The 1's place dial 6 is turned clockwise by a user to advance the counter readout, which after the number 9 will automatically trigger the middle dial assembly 7 (10's place) to advance in a counterclockwise manner one digit and reset the right-most dial 6 to zero. This triggering/advancing action is facilitated by a rectangular protrusion 14*a* on a top surface of the back dial 14 (i.e., the 1's digit) located at numeral 9 interdigitates with one of a plurality of protrusions 13*a* on a bottom surface of a back dial 13 of the middle dial 7 (10's digit dial) at the 9 digit forcing it forward one digit to advance the back dial 13 (10's place) while at the same time resetting the back dial 14 (1's place) to 0. The 10's place, which is the middle dial 7, includes the back dial 13, which is fitted with gears on its top surface and which is controlled by a center arm of a spring finger 19, and a front readout dial 7 which is detailed with the numbers 1-9. The front readout dial 7 fits into the top of the back dial 13 and is located in between the front readout dial 12 and a front readout dial 11. The 100's place is located to the far left and includes a back dial 5 fitted with gears on the bottom which engage with a left-most arm of the spring finger 19, and a top readout dial 11 which is detailed with the numbers 1-9 and can be rotated clockwise by the user to advance the digit up to 9. The numbered dials 5, 6, 7 are held in place by the interior spring finger 19 which prevents unwanted advancement.

Figure 5:
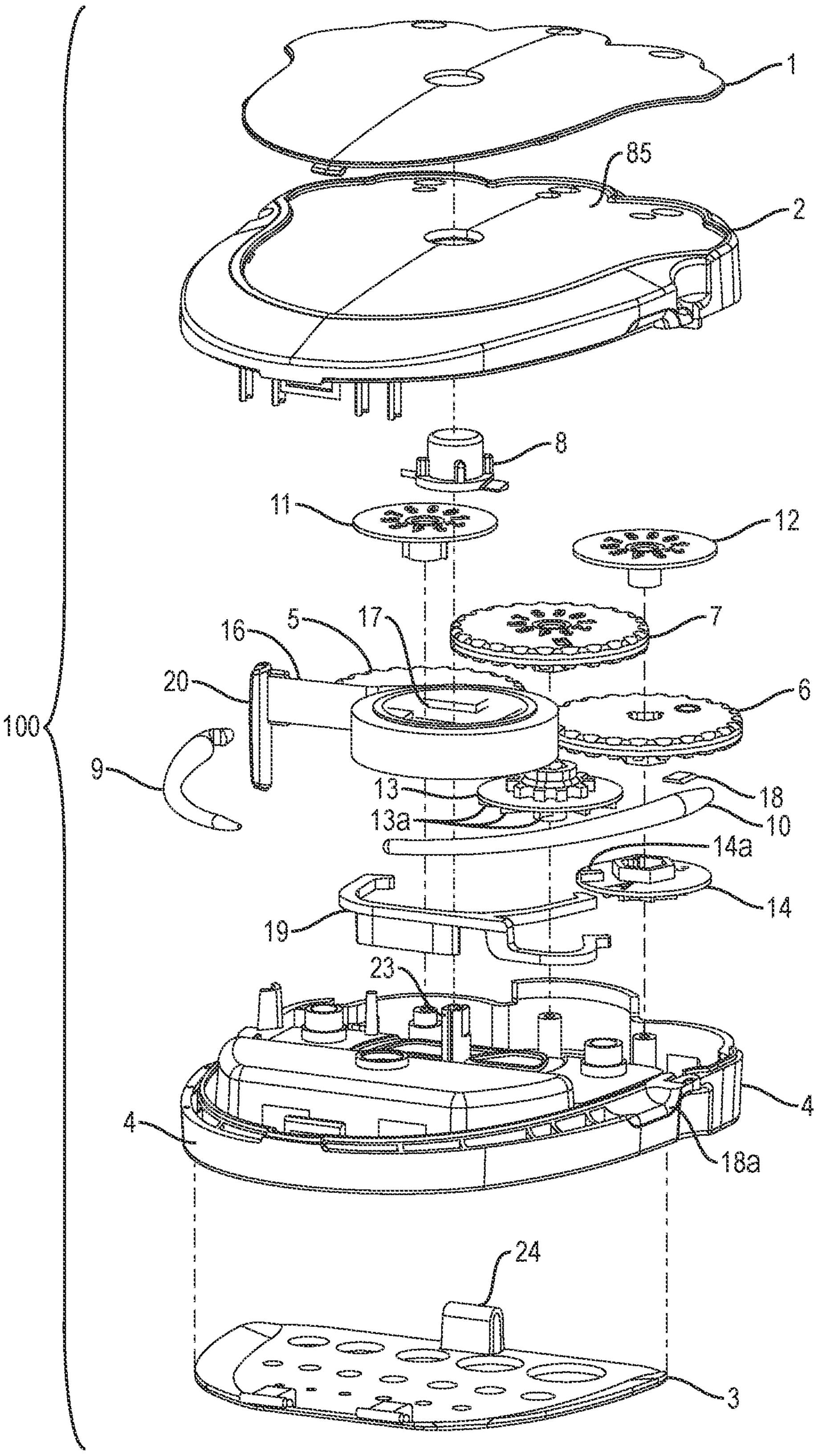
FIG. 5 is a disassembled/exploded view of the fiber art multitool of FIG. 1.

A tape measure release button 8 houses a coil spring which is placed into a post 23 holding an interior circular tape hub 17 in place (see FIG. 5). A tape measure 16 is coiled (wrapped) around the tape measure hub 17 on the outside and a constant force spring (not pictured) is coiled into the bottom of the tape hub 17 (see FIG. 6). A tape end 20 is attached to the tape measure 16 and the user pulls on the end to rotate the tape measure hub 17 and extend the tape measure 16 outside of the multitool 100. The tape measure release button 8 is pressed by the user triggering the constant force spring located in the bottom of the tape hub 17 to recoil and rotate in the opposite direction to retract the tape measure 16 back into the multitool 100. A blade 18 is pressure fit into a cavity 18*a* molded/formed in the bottom portion of the housing 90 (i.e., the bottom cover 4) and utilized for cutting string, yarn, thread etc.

FIG. 1 is a top plan view of the fiber art multitool 100 according to an embodiment. A user of the multitool 100 rotates the right-most dial (1's place) 6 located on the top of the housing 90 in a clockwise direction to advance the counter readout, which, upon reaching the number nine (9). will automatically trigger the middle dial (10's place) 7 to advance in a counterclockwise manner one digit and reset the right-most dial (1's place) 6 to zero. The left-most dial (100's place) 5 can be rotated in a clockwise direction by the user to advance the digit up to nine (9). Numbers are held in place by an interior spring finger (not pictured) which prevents unwanted advancement.

Reference is now made to FIGS. 1, 2A, 2B, 4A and 5. The metal blade 18 (secured in the cavity 18*a* molded/formed in the bottom cover 4 of the housing 90, as described above) is utilized to cut string, yarn, thread etc. The tape end 20 at the end of the tape measure 16 is retracted inside the multitool 100 and can be extended by pulling it outward. The tape measure release button 8 is utilized via a coil spring when pushed to activate the constant force spring (both springs not pictured) to automatically retract the tape measure 16 back into/inside of the multitool 100.

Figure 3A:
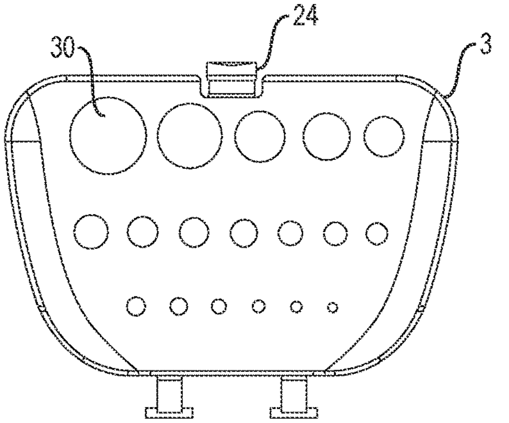
FIG. 3A is a detailed view of version A of the rear door shown in FIG. 2A with a needle gauge.

FIG. 2A is a bottom plan view of the fiber art multitool 100 with a version A of the rear housing door 3, according to one embodiment. The door 3 opens to reveal one or more storage compartments 25 (see FIG. 2C) utilized to hold additional tools and accessories utilized in fiber arts. This particular door 3 is outfitted with a needle gauge 30, as also shown in FIG. 3A.

Figure 3B:
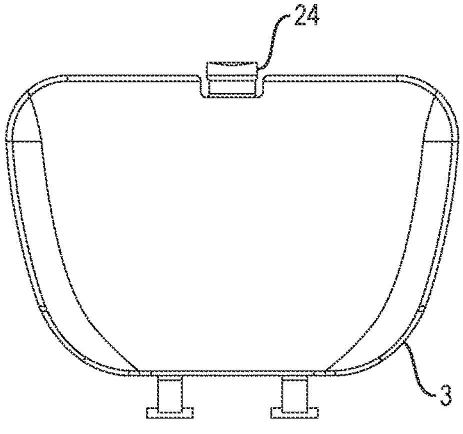
FIG. 3B is a detailed view of version B of the rear door shown in FIG. 2B.

FIG. 2B is a bottom plan view of the fiber art multitool 100 with version B of the rear housing door 3 according to another embodiment. The door 3 opens to reveal one or more storage compartments 25 (see FIG. 2C) utilized to hold additional tools and accessories utilized in fiber arts, and is also shown in FIG. 3B. This particular door 3 is solid for fiber artists who do not need/use a needle gauge.

FIG. 2C is a bottom plan view of the fiber art multitool 100 without the rear housing door 3, according to one embodiment.

In one embodiment, the multitool 100 has two storage compartments 25A, 25B. For example, as shown in FIG. 2C, a top storage compartment 25A is utilized to store collapsible scissors while a bottom storage compartment 25B that is deeper than the top storage compartment 25A is utilized to hold notions in relation to applicable fiber art including but not limited to needles, pins, stitch markers, point protectors, rings, safety pear pins, thimbles, nail file, stitch holder, string/threads, etc. In various embodiments, the storage compartments 25A, 25B are secured in a closed position by a cantilever snap-fit latch 24 located on the top of the rear housing door 3 (see FIGS. 3A, 3B and 5) that latches into rectangular cutout (not shown) located in the bottom cover 4. In these embodiments, the rear housing door 3 is held closed via the cantilever snap-fit latch 24, with the latch 24 being designed to latch into the cutout located in the bottom cover 4 and release when compressed via pressure from a user's hand/finger(s). Squeezing the latch 24 slightly releases the latch 24 and allows the latch 24 to release from the bottom cover 4.

As described above, FIGS. 3A and 3B show two versions of the rear housing door 3. FIG. 3A shows the rear housing door 3 having a needle gauge 30 and is utilized to both hold the contents of the storage pocket in the multitool 100 or to identify the sizing of fiber art needles in US sizes as well as in millimeters. FIG. 3B shows the rear housing door 3 as being solid (i.e., without a needle gauge) to hold the applicable contents of the storage pocket in the apparatus.

Figure 4A:
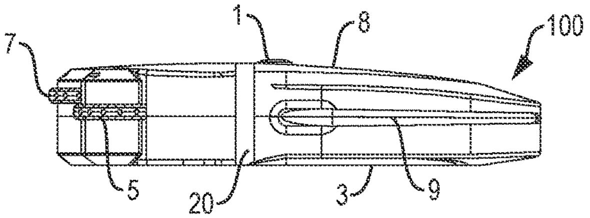
FIG. 4A is a left-side view of the fiber art multitool of FIG. 1.
Figure 4B:
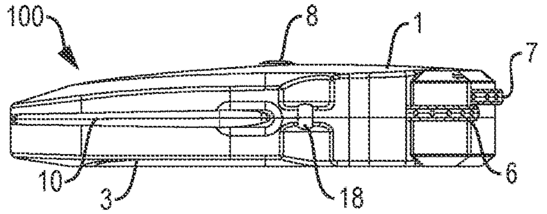
FIG. 4B is a right-side view of the fiber art multitool of FIG. 1.

FIGS. 4A and 4B are left- and right-side views, respectively, of the fiber art multitool 100.

The tape measure end 20 is located at the end of the tape measure 16 (not pictured) and to the left of the retracted nested tool 9. The nested tool 9 is a double ended curved crochet hook. The left most dial (100's place) 5 can be rotated clockwise by the user to advance the digit up to 9 and is located to the left of the tape measure end 20.

The blade 18 can be utilized to cut yarn, string, threat etc. The user rotates left most dial (1's place) 6 located on the top of the apparatus clockwise to advance the counter readout. The nested retracted tool 10 is a variegated pin utilized for cables in knitting and crochet.

In one embodiment, the multitool 100 has an ergonomic grip. The ergonomic grip is essentially the shape of the top cover 2 and rear door 3 of the multitool. The shape is the same on both sides for right- and left-handed users. The curvature of the side of the multitool 100 is designed to fit in the hand seamlessly and allow for use of the counter mechanism with ease.

In one embodiment, the multitool 100 includes an internal mechanism for indexing the numbers forward that eliminates the use of metal springs, as discussed above. The spring finger 19 acts as a ratchet preventing backspin of the counter back dials 13,14, advancing the counter one digit at a time when the 1's back dial 14 is turned clockwise by the user.

In one embodiment, the needle gauge 30 of the multitool 100 includes up to size US19/15 mm. In various other embodiments, the needle gauge 30 includes a range of US00/1.75 MM through US19/15 MM. In various embodiments, the rear side of the rear door 3 include the coordinating crochet hook letter sizes B through N.

In one embodiment, the rear storage compartment 25*a* is configured to be approximately 9 cm×3 cm×½ cm to accommodate differing collapsible scissors therein, and includes dividers 26 to hold the scissors in place to prevent movement (see FIG. 2C). The rear storage compartment 25*b* is configured to be approximately 9 cm×3 cm×½ cm to accommodate differing collapsible scissors therein.

In one embodiment, the counter wheels include dimples that differ between the 1's dial 6, the 10's dial 7 and the 100's dial 5. In one embodiment, the 1's digit counter/wheel includes bumps (i.e., larger protrusions than the dimples).

In various embodiments, the spring finger 19 is formed from a PA 66 resin, which is a hard material and ensures that the spring finger has the rigidity, and lacks the flexibility, to prevent backspin from occurring on the counter. This in turn facilitates a more aggressive dial engagement and louder audible "click". The middle arm angle of the spring finger 19 is positioned to significantly increase the spring force to be applied to the dial and thereby eliminate failure in the counter.

In one embodiment, the multitool 100 includes an audible clicking when advancing the numbers on the dials 5, 6 and 7.

In various embodiments, the double ended crochet hook 9 and variegated cable needle 10 are formed from Polymide 66 (PA66) resin, which ensures that these tools possess the rigidity required for their intended use. The PA 66 resin also has a low shrink rate that eliminates flash and thus eliminates unintended pulling on a fiber. The PA 66 resin is a general-purpose resin known for its high strength, rigidity, good toughness and has a shrink rate of 1.7%. This relatively high shrink rate produces a strong part which only allows the counter to advance in one direction, enhancing the sound of the audible click, and improving the overall operation of the counter, which is more desirable.

In alternate embodiments, the double ended crochet hook 9 and variegated cable needle 10 are formed from other materials/resins having the rigidity and other physical and chemical properties required for their intended use. Such a material, according to one embodiment, is Polymide 6 (PA6) resin, which is a crystalline injection molding resin utilized for fast processing due to its high flow and shrink rate of 0.55%

Figure 6:
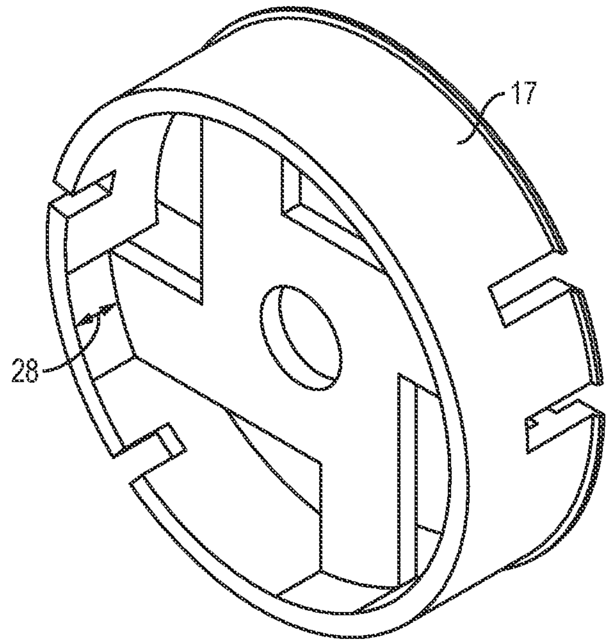
FIG. 6 is a top perspective view of a tape measure spool included in the fiber art multitool of FIG. 1.

In one embodiment, the tape measure spool is configured to nest the interior spring to prevent jamming. As shown in FIG. 6, the tape measure spool 17 houses the interior constant force spring (not shown) which controls the retraction of the tape measure 16. The spool 17 includes a deep nest 28 which houses the spring entirely so the edges of the spring are not exposed. The exposed edge would cause drag on the rear housing, jamming (i.e., the tape measure 16 would not retract or pay out because the end would be stuck on the rear housing) and/or create a loud undesired noise.

In various embodiments, the material of the dimpled dials 5, 6 and 7 is formed from PA 66 resin, which allows the dials to rotate freely without friction or interference.

In one embodiment, the metal blade 18 is glued in place (i.e., within the cavity 18*a*) with a pressure/interference fit to ensure that it stays in place.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Other embodiments of the invention will be apparent to those skilled in the art from consideration of the specification and practice of the invention disclosed herein. Although specific advantages have been enumerated above, various embodiments may include some, none, or all of the enumerated advantages. It is intended that the embodiments described above be considered as exemplary only, with a true scope and spirit of the invention being indicated by the appended claims. Moreover, none of the features disclosed in this specification should be construed as essential elements, and therefore, no disclosed features should be construed as being part of the claimed invention unless the features are specifically recited in the claims. In addition, it should be understood that any of the features disclosed on any particular embodiment may be incorporated in whole or in part on any of the other disclosed embodiments.

In any interpretation of the claims appended hereto, it is noted that no claims or claim elements are intended to invoke or be interpreted under 35 U.S.C. 112(f) unless the words "means for" or "step for" are explicitly used in the particular claim.

In general, any combination of disclosed features, components and methods described herein is possible. Steps of a method can be performed in any order that is physically possible.

All cited references are incorporated by reference herein.

Although embodiments have been disclosed, it is not desired to be limited thereby. Rather, the scope should be determined only by the appended claims.

While various embodiment of the present disclosure have been described in detail, it is apparent that modifications and alterations of those embodiments will occur to those skilled in the art. However, it is to be expressly understood that such modifications and alterations are within the scope and spirit of the present disclosure, as set forth in the following claims.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the present disclosure has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

In general, any combination of disclosed features, components and methods described herein is possible. Steps of a method can be performed in any order that is physically possible.

I claim:

1. A multitool comprising:

a housing including a top cover and a bottom cover cooperating with the top cover to create a cavity configured to hold one or more tools of the multitool;

the bottom cover including one or more storage compartments and a rear door configured to engage the one or more storage compartments;

a counter having a first dial representing the 1's place, a second dial representing the 10's place, and a third dial representing the 100's place, and wherein the counter is disposed within the housing; and an interior spring finger configured to hold the first dial, the second dial and the third dial in place;

wherein the first dial includes a first back dial which is fitted with a rear gear to engage with a right-most arm of the spring finger, wherein the second dial includes a second back dial and is configured to engage with a center arm of the spring finger, and wherein the third dial includes a third back dial and is configured to engage with a left-most arm of the spring finger;

wherein the first and second back dials include means for advancing the second dial.

2. The multitool of claim 1, wherein the advancing means includes a first protrusion on a top surface of the first back dial and a plurality of second protrusions on a bottom surface of the second back dial, the first protrusion configured to interdigitate with ones of the plurality of second protrusions.

3. The multitool of claim 1, further comprising a lens engaging an upper side of the top cover.

4. The multitool of claim 3, wherein the top cover includes a recess formed in the upper side of the top cover, the recess being configured to receive the lens therein.

5. The multitool of claim 1, wherein the one or more tools includes a hook and pin.

6. The multitool of claim 1, wherein the one or more tools includes a tape measure.

7. The multitool of claim 1, wherein the one or more tools includes a blade.

8. The multitool of claim 1, wherein the rear door includes a needle gauge.

9. The multitool of claim 8, wherein the needle gauge identifies sizing of fiber art needles in both US sizes and millimeters.

10. A multitool comprising:

a housing including a top cover and a bottom cover cooperating with the top cover to create a cavity for holding one or more tools of the multitool;

the bottom cover including one or more storage compartments and a rear door configured to engage the one or more storage compartments;

a counter having a first dial representing the 1's place, a second dial representing the 10's place, and a third dial representing the 100's place, and wherein the counter is disposed within the housing; and an interior spring finger configured to secure the first, second and third dials;

wherein the first dial includes a first back dial which is fitted with a rear gear to engage with a right-most arm of the spring finger, wherein the second dial includes a second back dial and is configured to engage with a center arm of the spring finger, and wherein the third dial includes a third back dial and is configured to engage with a left-most arm of the spring finger;

wherein the first and second back dial include means for advancing the second dial;

wherein the advancing means includes a first protrusion on a top surface of the first back dial and a plurality of second protrusions on a bottom surface of the second back dial, the first protrusion configured to interdigitate with ones of the plurality of second protrusions.

11. The multitool of claim 10, wherein the one or more tools includes a hook and pin.

12. The multitool of claim 10, wherein the one or more tools includes a tape measure.

13. The multitool of claim 10, wherein the one or more tools includes a blade.

14. The multitool of claim 10, wherein the rear door includes a needle gauge.

* * * * *